United States Patent
Aboughanaima et al.

(10) Patent No.: US 9,325,699 B2
(45) Date of Patent: *Apr. 26, 2016

(54) METHOD FOR APPARATUS FOR ROUTING APPLICATION PROGRAMMING INTERFACE (API) CALLS

(71) Applicant: Vonage America Inc., Holmdel, NJ (US)

(72) Inventors: Mabrouk Aboughanaima, Matawan, NJ (US); Chakrapani Gorrepati, Morganville, NJ (US); Deepak Ottur, Belle Mead, NJ (US); John Erickson, Seattle, WA (US)

(73) Assignee: Vonage America Inc., Holmdel, NJ (US)

( * ) Notice: Subject to any disclaimer, the term of this patent is extended or adjusted under 35 U.S.C. 154(b) by 8 days.

This patent is subject to a terminal disclaimer.

(21) Appl. No.: 13/928,066

(22) Filed: Jun. 26, 2013

(65) Prior Publication Data

US 2014/0282968 A1    Sep. 18, 2014

Related U.S. Application Data (60) Provisional application No. 61/791,285, filed on Mar. 15, 2013.

(51) Int. Cl.
*G06F 17/30* (2006.01)
*H04L 29/06* (2006.01)
(Continued)

(52) U.S. Cl.
CPC .............. *H04L 63/083* (2013.01); *H04L 63/08* (2013.01); *H04L 63/0884* (2013.01); *H04M 3/38* (2013.01); *H04M 7/0012* (2013.01);
(Continued)

(58) Field of Classification Search
CPC ... H04L 63/083; H04L 63/0884; H04L 63/08; H04M 7/0012; H04M 3/38; H04M 2207/30; H04M 2201/54
See application file for complete search history.

(56) References Cited

U.S. PATENT DOCUMENTS

| 2008/0209451 A1 | 8/2008 | Michels et al. |
| 2008/0259908 A1* | 10/2008 | Hines et al. .................. 370/352 |

(Continued)

FOREIGN PATENT DOCUMENTS

WO    WO-2012119620 A1    9/2012

OTHER PUBLICATIONS

PCT Search Report and Written Opinion, International Application No. PCT/US2014/025595, mailed Jun. 23, 2014, 101 pages.

*Primary Examiner* — Andrew Nalven
*Assistant Examiner* — Mohammed Waliullah
(74) *Attorney, Agent, or Firm* — Moser Taboada; Joseph Pagnotta (57) ABSTRACT

A method and apparatus for routing Application Programming Interface (API) calls from a partner entity to a telephony service provider (TSP) network are provided herein. In some embodiments, a method for routing API calls may include receiving a first message including an API call and a partner API key used to authenticate the partner entity on the TSP network to access a partner API layer disposed on the TSP network, extracting the partner API key from the first message, performing an authentication process to authenticate an identity of the partner entity using at least the extracted partner API key, and routing the first message based on results of the authentication process. In some embodiments, the first message is routed to the partner API layer disposed on the TSP network when the identity of the partner entity is authenticated.

24 Claims, 5 Drawing Sheets

(51) Int. Cl.
*H04M 3/38* (2006.01)
*H04M 7/00* (2006.01)

(52) U.S. Cl.
CPC ....... *H04L 63/0281* (2013.01); *H04M 2201/54* (2013.01); *H04M 2207/30* (2013.01)

(56) References Cited

U.S. PATENT DOCUMENTS

| | | |
|---|---|---|
| 2009/0199276 A1 | 8/2009 | Schneider |
| 2009/0201919 A1 | 8/2009 | Swartz |
| 2009/0328174 A1 | 12/2009 | Cen et al. |
| 2012/0180021 A1* | 7/2012 | Byrd et al. .................... 717/100 |
| 2012/0180029 A1 | 7/2012 | Hill et al. |
| 2012/0284802 A1 | 11/2012 | Hierro et al. |
| 2013/0104200 A1 | 4/2013 | Choi et al. |
| 2013/0269041 A1 | 10/2013 | Hill et al. |
| 2013/0276082 A1 | 10/2013 | Kuang et al. |
| 2014/0082707 A1 | 3/2014 | Egan et al. |
| 2014/0108474 A1 | 4/2014 | David et al. |
| 2014/0115676 A1 | 4/2014 | Coghlan et al. |
| 2014/0185089 A1 | 7/2014 | Nuggehalli et al. |
| 2014/0188735 A1 | 7/2014 | Fisher |
| 2014/0280961 A1 | 9/2014 | Martinez et al. |

\* cited by examiner

METHOD FOR APPARATUS FOR ROUTING APPLICATION PROGRAMMING INTERFACE (API) CALLS

CROSS-REFERENCE TO RELATED APPLICATIONS

This application claims benefit of U.S. provisional patent application Ser. No. 61/791,285, filed Mar. 15, 2013, which is herein incorporated by reference.

BACKGROUND OF THE INVENTION

1. Field of the Invention

Embodiments of the present invention generally relate to a scalable, secure and reliable partner interface system for establishing and authenticating third party business service providers, and receiving and routing API calls to and from a telephony service provider's network.

2. Description of the Related Art

Telephony service providers (TSP) may partner with external service providers to provide telephony services to each other's customers. In some situations, service providers may sign up customers for telephony service but may not possess the capability or capacity to handle certain types or volumes of service. The service provider may partner with another TSP to provide those telephony services, or other types of services. In other situations, a TSP may partner with regional business partners to sign up customers on the TSP's behalf.

To facilitate the above-mentioned partnership, as well as applications of third party business service providers, a scalable, secure and reliable infrastructure and interface to the TSP network is needed. Accordingly, there exists a need in the art for a method and apparatus to support provisioning of accounts, devices, services and features in the TSP network.

SUMMARY OF THE INVENTION

A method and apparatus for routing Application Programming Interface (API) calls from a partner entity to a telephony service provider (TSP) network are provided herein. In some embodiments, a method for routing API calls may include receiving a first message including an API call and a partner API key used to authenticate the partner entity on the TSP network to access a partner API layer disposed on the TSP network, extracting the partner API key from the first message, performing an authentication process to authenticate an identity of the partner entity using at least the extracted partner API key, and routing the first message based on results of the authentication process. In some embodiments, the first message is routed to the partner API layer disposed on the TSP network when the identity of the partner entity is authenticated.

In some embodiments, an apparatus for routing API calls from a partner entity to a TSP network includes at least one processor, at least one input device, and at least one storage device storing processor executable instructions which, when executed by the at least one processor, performs a method including receiving a first message including an API call and a partner API key used to authenticate the partner entity on the TSP network to access a partner API layer disposed on the TSP network, extracting the partner API key from the first message, performing an authentication process to authenticate an identity of the partner entity using at least the extracted partner API key, and routing the first message based on results of the authentication process.

In some embodiments, a non-transient computer readable medium for storing computer instructions that, when executed by at least one processor causes the at least one processor to perform a method for routing API calls may include receiving a first message including an API call and a partner API key used to authenticate the partner entity on the TSP network to access a partner API layer disposed on the TSP network, extracting the partner API key from the first message, performing an authentication process to authenticate an identity of the partner entity using at least the extracted partner API key, and routing the first message based on results of the authentication process.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments of the present invention generally relate to a scalable, secure and reliable partner interface system for establishing partners and provisioning telephony customers in a telephony service provider's network. Some embodiments of the present invention include a partner API that may be accessed by a partner service provider (referred to herein as the partner), to provide a set of services and or modules that support provisioning of accounts, devices, services and features using the TSP network. For example, a TSP may agree with a partner to provide Voice over Internet Protocol (VOIP) network services to customers that sign up for service through the partner using the TSP's VOIP network. In other examples, other types of services providers may agree to provide services to customers signed by external partners. Although described herein in terms of telephony service providers, the TSPs may provide other types of services that embodiments of the present invention may be used with, for example, Web-based services and the like.

When a TSP establishes a service relationship with a partner on whose behalf the TSP will provide telephony services to customers that the partner signs up, the partner first needs to be setup to securely access the TSP network via an API and related systems. Furthermore, when a partner signs up a customer for telephony service that is to be provided by the TSP, certain information (also described as entities herein) need to be managed in the TSP network including, but not limited to, partner information, customer account information, service type information, device information, and the like.

Partner information may be associated with a specific partner in the system. Each partner has a unique partner ID and associated security keys. When a partner is added to the system, the set of applicable features and default feature values can be specified for the partner.

Customer account information may be contained in information objects representing customers in the TSP network. Each customer may be given a globally unique network account number within the TSP system. In some embodiments, this network account information may not be the same as the partner's Customer Relationship management (CRM) information regarding the customer or billing account information which may be housed in different partner Business Support Systems (BSS).

Service type information may be contained in information objects representing the types of telephony service the TSP can provide, for example, VOIP, short message service (SMS), and the like. Each service type may be represented by a globally unique service Identifier. A service type may include a number of other attributes related to the type of service represented. The service identifier identifies an instance of a service type that is associated with a partner account. For example partner account #1001 may have two service types, VoIP and SMS, with service identifiers #8001 and #8002, respectively. Similarly, partner account #1002 may have two service types, VoIP and SMS, with service identifiers #8003 and #8004 respectively.

Device information may include information about the hardware devices used, if any, in providing the service that the customer signed up for. For example, if a customer signs up for VOIP service, the device information may include information regarding a VOIP Telephony adapter on which service is provided. In some embodiments, devices are identified by their globally unique MAC address. It is noted that not all service types require hardware devices.

For the above information objects, there are various operations that may be performed on each object. Such operations may include adding a new entity in to the system and associating them with other entities, changing the settings for an existing entity, change the status of an entity, and retrieving the settings for a given entity.

To create, access and manage the aforementioned information, exemplary embodiments include a security proxy layer that provides scalable, secure and reliable access to a partner API layer, and is described below.

Some portions of the detailed description which follow are presented in terms of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Figure 1:
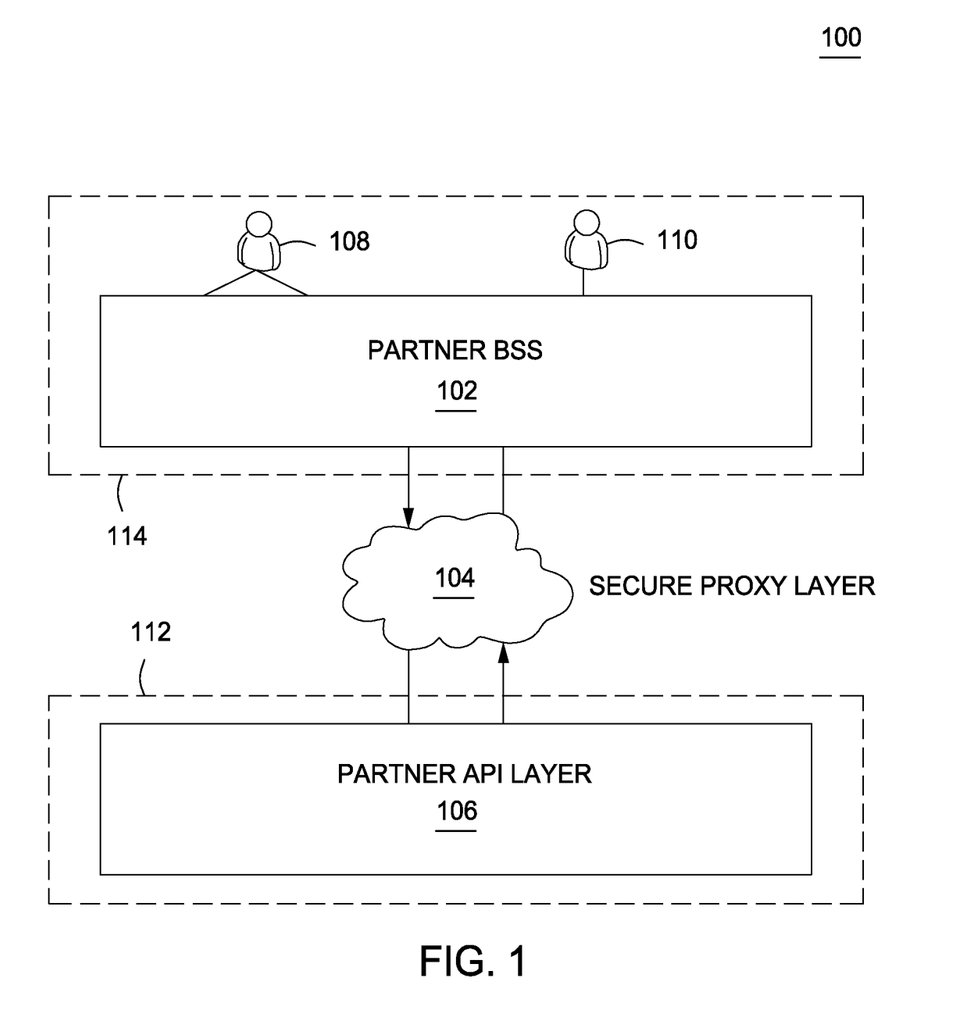
FIG. 1 depicts a block diagram of a telecommunication network, in accordance with embodiments consistent with the present application.

FIG. 1 depicts a block diagram of a system 100 that includes a partner Business Support Systems (BSS) 102, a secure proxy layer 104, and a partner API layer 106.

In some embodiments, the partner BSS 102 may be disposed on the partner's network 114. A customer 108 may subscribe for telephony service or login to an existing account using the partner BSS 102. In some embodiments, the partner API layer may be disposed on the TSP network 112. The telephony service that is to be provided to the customer may be provided by the TSP network 112. In addition, a partner service agent 110 may subscribe for a new account on behalf of a customer 108 or may access existing customers account information (e.g., to add, modify, remove features, etc.) through the partner BSS.

In some embodiments, the secure proxy layer 104 will perform key management for partners and will authenticate/authorize all requests from the partner BSS 102 before authorizing/allowing access to the partner API layer 106. The secure proxy layer 104 can also perform other API management tasks like data throttling of API calls if required. In some embodiments, the throttling rate of API calls can be individually configured on a per partner level, or on particular sets of partners grouped together based on one or more common features between the partners (e.g., partners for a specific country, size of partner, and the like). In some embodiments, the secure proxy layer 104 may be a cloud based security proxy into the partner API layer 106. In other embodiments, the secure proxy layer 104 may be located within the TSP network 112.

As new partners are added there will be an "onboarding" process required to setup the new partner via the secure proxy layer 104. This will involve generating security keys for communication between partner BSS 102 and the TSP network 112 and between the TSP network 112 and partner BSS 102. In some embodiments, the partner will need to provide list of servers/devices (e.g., a whitelist of approved devices identified by a MAC address or an Internet Protocol (IP) address) that will be sending requests to partner API layer 106 via the secure proxy layer 104. Similarly, for embodiments where 104 is a cloud based service, the secure proxy layer 104 may be required to provide a whitelist of servers to the partner API layer 106 that can send authenticated requests to partner API layer 106.

With the secure proxy layer 104 as a proxy between the partner BSS 102 and the partner API layer 106 on the TSP network, the partner BSS 102 will be able to access API services such as adding/modifying network accounts, services, devices, and features. This may be done by making predefined calls to API modules disposed in partner API layer 106. In addition, the partner API layer 106 will also be able to access customer data stored in partner BSS 102 by also making predefined API module calls (e.g., call backs). In some embodiments, the secure proxy layer 104 will authenticate the call backs using a separate API key before routing the requests to the partner BSS 102. The secure proxy layer 104 may be required to provide a whitelist of servers to the BSS 102 that that can send authenticated requests to partner BSS 102. All API module calls from the partner BSS 102 that are made directly to the partner API layer 106 will be redirected through the secure proxy layer 104. In some embodiments, the redirected calls may be delivered over a Hypertext Transfer Protocol Secure (HTTPS) connection.

For each of the TSP's partners established, at least one API key will be generated by the secure proxy layer 104. In some embodiments, the secure proxy layer 104 may include an API management dashboard to create/establish a partner and create said keys. In some embodiments, a first API key is used by partner BSS 102 to access the partner API layer 106, and a second API key is used by the partner API layer 106 to call back the partner BSS 102. These bidirectional communications are secured by the API keys created by the secure proxy layer 104. In some embodiments, the API keys, together with a partner ID, may be embedded into a Simple Object Access Protocol (SOAP) envelope body and delivered in service request messages. When the secure proxy layer 104 receives messages from partner BSS 102 or the partner API layer 106, the secure proxy layer 104 will automatically extract the API key values from the SOAP message body and validate it against the key value generated for the partner. In some embodiments, only API key matched messages will pass through the secure proxy layer 104 to appropriate endpoints. In some embodiments, non-matching messages will be discarded with a response message "Access Denied" or the equivalent.

Figure 2:
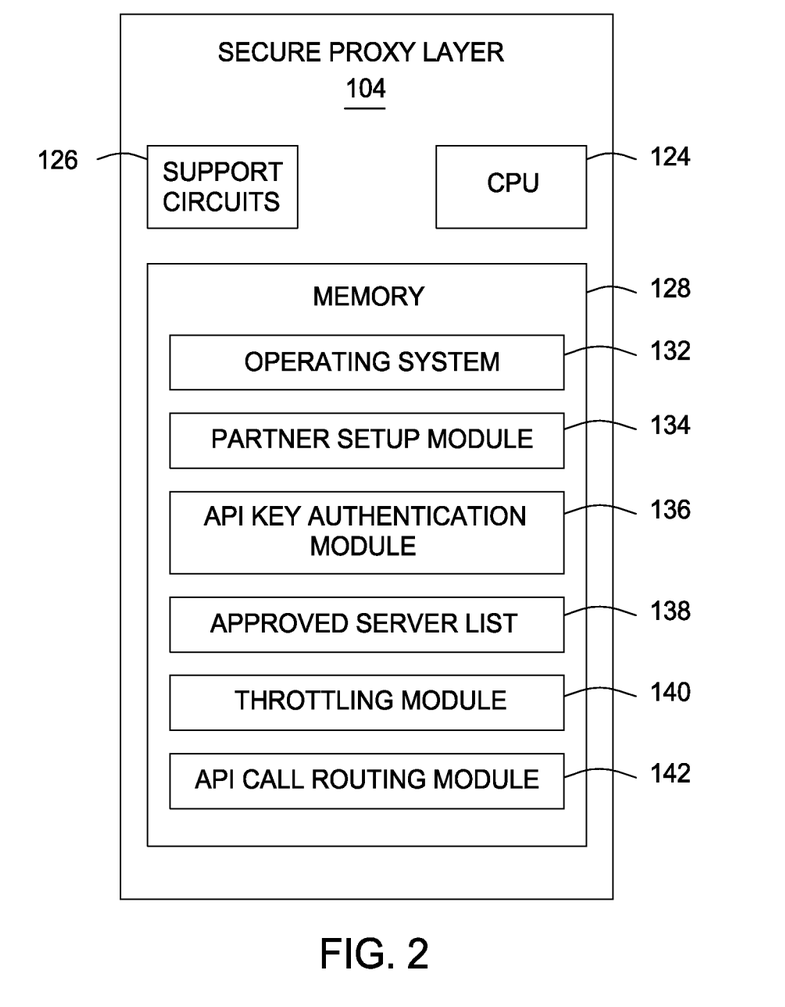
FIG. 2 depicts a block diagram of an exemplary secure proxy layer, in accordance with embodiments consistent with the present application.

As shown in FIG. 2, the secure proxy layer 104 may include one or more Central Processing Units (CPU) 124, support circuits 126, and memory 128. The CPU 124 may comprise one or more commercially available microprocessors or microcontrollers that facilitate data processing and storage. The various support circuits 126 facilitate the operation of the CPU 124 and include one or more clock circuits, power supplies, cache, input/output circuits, and the like. The memory 128 comprises at least one of Read Only Memory (ROM), Random Access Memory (RAM), disk drive storage, optical storage, removable storage and/or the like. In some embodiments, the memory 128 comprises an operating system 132, partner setup module 134, API key authentication module 136, approved server list 138, throttling module 140, and API call routing module 142.

The operating system (OS) 132 generally manages various computer resources (e.g., network resources, file processors, and/or the like). The operating system 132 is configured to execute operations on one or more hardware and/or software modules, such as Network Interface Cards (NICs), hard disks, virtualization layers, firewalls and/or the like. Examples of the operating system 132 may include, but are not limited to, LINUX, MAC OSX, BSD, UNIX, MICROSOFT WINDOWS, IOS, ANDROID and the like.

The partner setup module 134 creates the one or more API keys as described above when establishing a new partner with the TSP. The API key authentication module 136 may be used to authenticate the API keys received. After the API keys are matched/authenticated, the API call routing module 142 may route the API calls to their appropriate destination.

In some embodiments, after a partner is authenticated, additional authorization may be performed for each API call made by the partner. Specifically, when a partner is authenticated and identified, the partner may only be authorized to use a subset of the total API calls available on the partner API layer 106. The API features and functions that are authorized to be used by that partner are the only ones that will be acted upon by the partner API layer 106. If a partner requests a feature/function that it is not authorized for use, the partner API layer 106 will respond with an error and will not route the message to the relevant downstream internal network components. In some embodiments, the partner API layer 106 may perform the additional partner API call authorization described above. The API call authorization information is stored in a database table. The information is checked for each API call. In some embodiments, the API call authorization database table is set up when provisioning a partner. The table can be modified at any time to change permissions. Since these permissions are typically governed by business agreements, the changes are usually few and far in between, and thus, in some embodiments, the changes may be made manually. In other embodiments, the API call authorization database table may be updated automatically.

Before routing the API calls to their appropriate destination, the secure proxy layer 104 may authenticate the identity of the partner BSS servers/devices against an approved server list 138. If the originating server of the API call to the partner API layer 106 from the partner BSS 102 is not on the list, the API call may return an "ACCESS DENIED" error message, or other error message including the reason for the denial of access.

In some embodiments, if the volume of API calls becomes a problem for the partner API layer 106, a throttling module 140 may be used to throttle the number of API calls to or from the partner API layer 106.

In some embodiments, the partner API layer 106 may perform functions that provide performance data and business intelligence associated with use of the partner API layer 106. Specifically, in some embodiments, the partner API layer 106 may gather timing data for each API call. Such timing data may provide insight regarding performance issues and bottlenecks in the API system. In some embodiments, the secure proxy layer 104 may gather counts and information regarding the different API calls made by each partner (both authorized and unauthorized calls). Such API call information may provide business intelligence with respect to new customer signups or terminations, API calls/features most often used/modified, and the like.

Figure 3A:
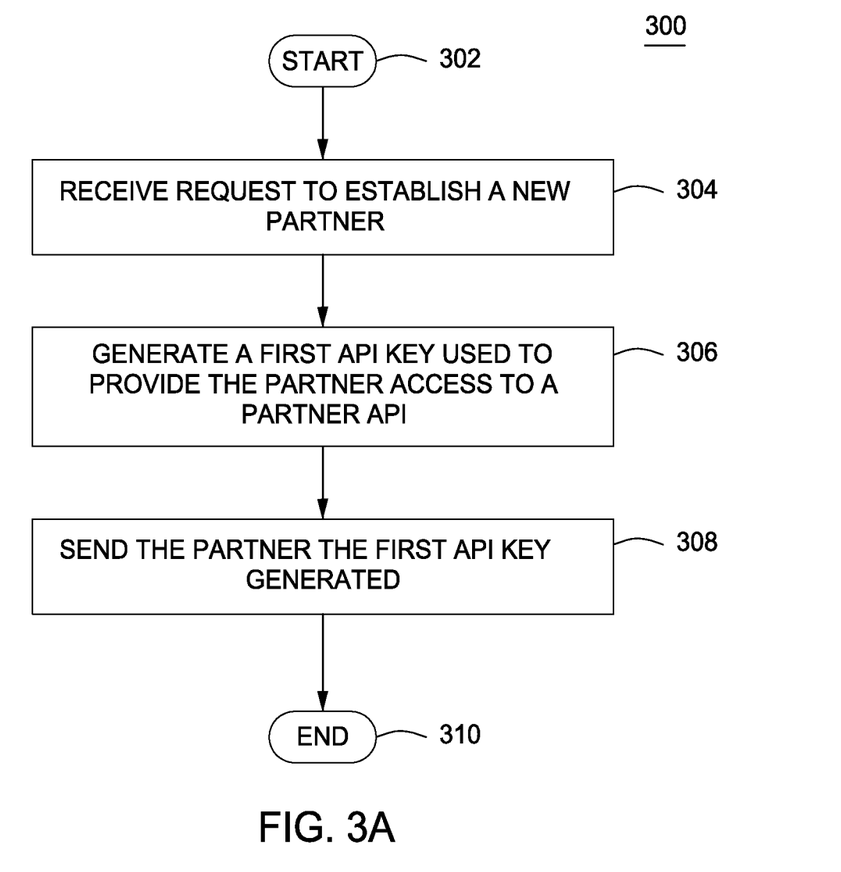
FIG. 3A depicts a flowchart for establishing and authenticating partners according to one or more embodiments of the invention.

A method 300 in accordance with the subject invention is illustrated in FIG. 3A which depicts a flowchart having a series of steps for establishing and authenticating partners in a TSP's network. In detail, the method 300 starts at 302 and proceeds to 304 where a request to establish a new partner is received. In some embodiments, the request is received by the secure proxy layer 104 from the partner BSS 102. The request may be an HTTP request in the form of SOAP or Representational State Transfer (REST) message, or embedded in the body of the SOAP or REST message or similar type of message. In some embodiments, the request may be sent over a Hypertext Transfer Protocol Secure (HTTPS) connection or over a dedicated Virtual Private Network (VPN) connection between the partner BSS 102 and the secure proxy layer 104.

At 306, the secure proxy layer 104 may generate a first API key used to provide the partner access to a partner API layer 106. In some embodiments, the API key may be an encrypted key or secure token generated which is used by the TSP to authenticate the partner. At 308 the generated partner API key is sent to the partner. The API key may be in the form of a SOAP or a REST message, or embedded in the body of the SOAP or REST message or similar type of message. In some embodiments, the request may be sent over a HTTPS connection or over a dedicated VPN connection between the partner BSS 102 and the secure proxy layer 104. In response to the request to establish a new partner, the secure proxy layer 104 and/or modules/devices disposed on the TSP network will create partner information objects that include a unique partner ID associated with the generated API keys for the partner. In addition, when establishing a new partner on the TSP network, the partner may be requested to provide list of servers/devices (i.e., a whitelist of approved devices identified by a MAC address for example) that will be sending/generating API calls to partner API layer 106 via the secure proxy layer 104. Additional information regarding the partner may also be stored in the partner information objects such as partner contact information, customer billing rates, authorized API calls, and the like. The method 300 ends at 310

After the partner has been established, the partner can set up (i.e., provision) and manage telephony customers on the TSP network by making API calls to the partner API layer 106 via the secure proxy layer 104.

Figure 3B:
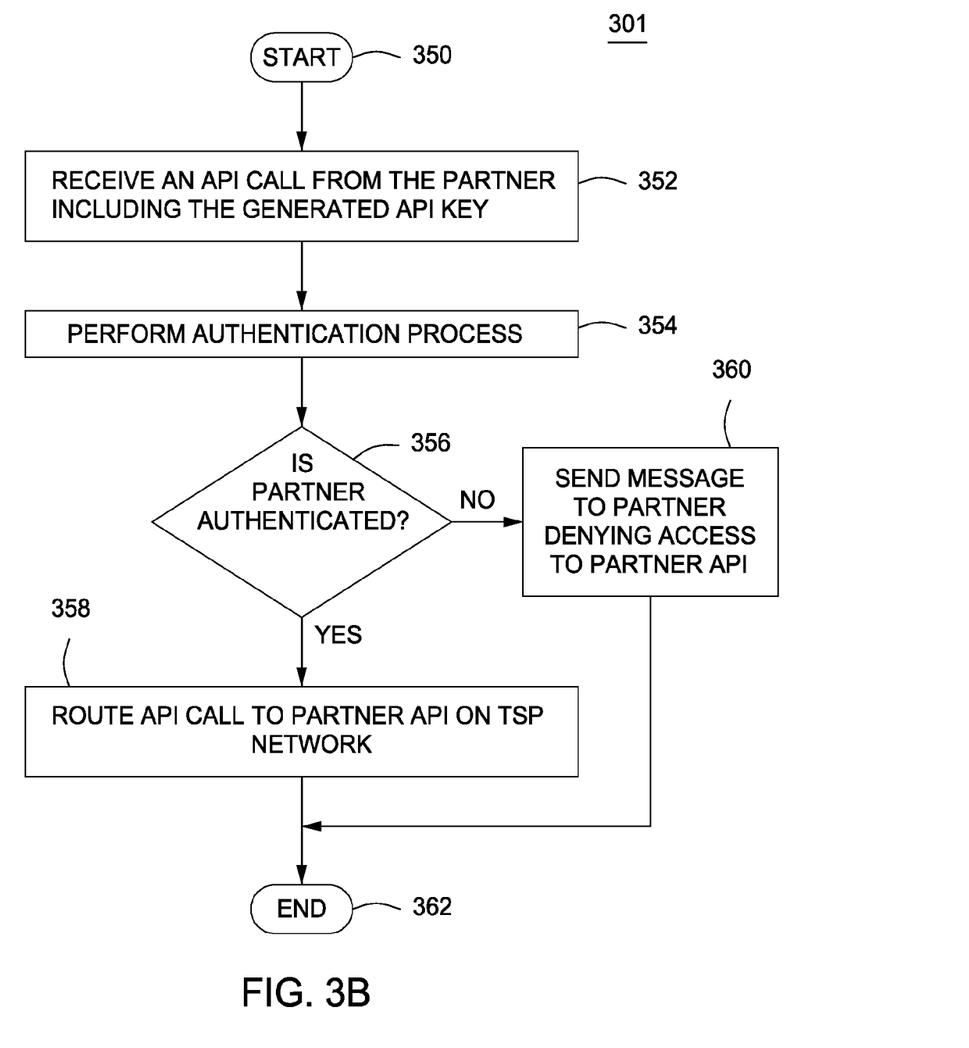
FIG. 3B depicts a flowchart for receiving and routing API calls according to one or more embodiments of the invention.

For example, FIG. 3B depicts a flowchart of a method 301 for receiving and routing API calls according to one or more embodiments of the invention. In detail, the method 301 starts at 350 and proceeds to 352, where the secure proxy layer 104 may receive one or more API calls from the partner including the generated API key. In some embodiments, the API keys, together with a partner ID, may be embedded into a SOAP envelope body and delivered in service request messages as described above. The API calls received at 352 may include requests to establishing new customers and managing and provisioning telephony services for customers on the TSP's network. At 354, after the secure proxy layer 104 receives messages from partner BSS 102 or the partner API layer 106, the secure proxy layer 104 will perform an authentication process to authenticate the identity of the partner entity. In some embodiments, the authentication process may automatically extract the API key value(s) from the message body and validate it against the key value(s) generated for the partner to authenticate the partner. In some embodiments, validating the API key values generated may include performing a direct comparison of API key value pairs. In other embodiments, information derived using the API keys may be used to authenticate the partner entity (e.g., such as hash values, and the like). At 356, if the partner is authenticated, the API key matched messages will pass through the secure proxy layer 104 and be routed by the secure proxy layer 104 to the partner API layer at 358. The partner API layer will then direct the messages to appropriate endpoints on the TSP network. As noted above, the API call may be in the form of a SOAP or REST message. In some embodiments, the secure proxy layer 104 will transparently pass the message after authentication to the partner API layer, which will then extract relevant fields and construct a new message(s) and send it to downstream components. If the partner is not authenticated at 356, non-matching messages may be discarded with a response message being sent to the partner denying access to the partner API at 360. The method 301 ends at 362.

The embodiments of the present invention may be embodied as methods, apparatus, electronic devices, and/or computer program products. Accordingly, the embodiments of the present invention may be embodied in hardware and/or in software (including firmware, resident software, micro-code, and the like), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus or device. More specific examples (a non exhaustive list) of the computer-readable medium include the following: hard disks, optical storage devices, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java™, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Figure 4:
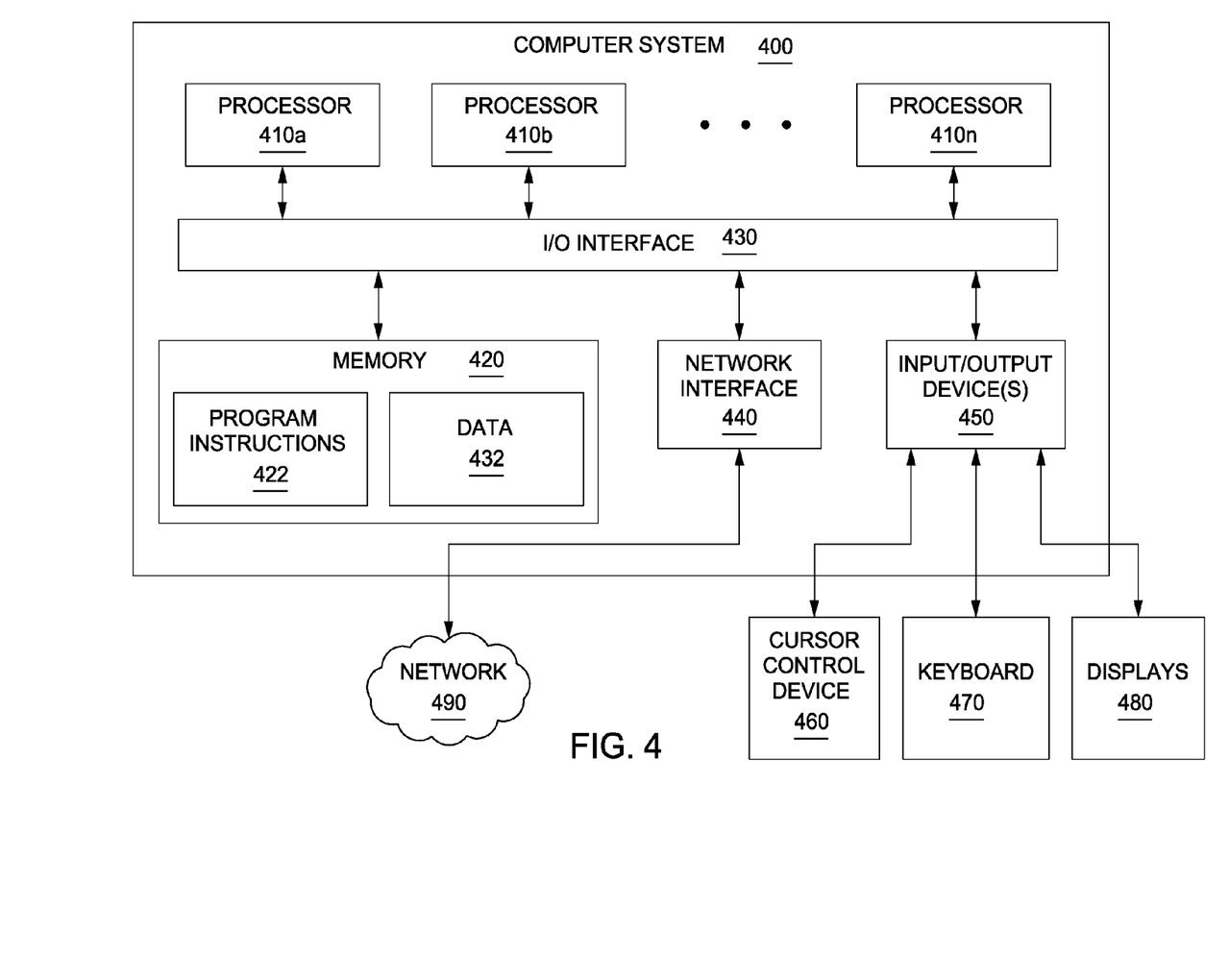
FIG. 4 is a detailed block diagram of a computer system, according to one or more embodiments.

FIG. 4 depicts a computer system 400 that can be utilized in various embodiments of the present invention to implement the computer and/or the display, according to one or more embodiments.

Various embodiments of method and apparatus for routing calls based upon internal network conditions and/or external carrier network information, as described herein, may be executed on one or more computer systems, which may interact with various other devices. One such computer system is computer system 400 illustrated by FIG. 4, which may in various embodiments implement any of the elements or functionality illustrated in FIGS. 1-3. In various embodiments, computer system 400 may be configured to implement methods described above. The computer system 400 may be used to implement any other system, device, element, functionality or method of the above-described embodiments. In the illustrated embodiments, computer system 400 may be configured to implement method 300 as processor-executable executable program instructions 422 (e.g., program instructions executable by processor(s) 410) in various embodiments.

In the illustrated embodiment, computer system 400 includes one or more processors 410a-410n coupled to a system memory 420 via an input/output (I/O) interface 430. Computer system 400 further includes a network interface 440 coupled to I/O interface 430, and one or more input/output devices 450, such as cursor control device 460, keyboard 470, and display(s) 480. In various embodiments, any of the components may be utilized by the system to receive user input described above. In various embodiments, a user interface may be generated and displayed on display 480. In some cases, it is contemplated that embodiments may be implemented using a single instance of computer system 400, while in other embodiments multiple such systems, or multiple nodes making up computer system 400, may be configured to host different portions or instances of various embodiments. For example, in one embodiment some elements may be implemented via one or more nodes of computer system 400 that are distinct from those nodes implementing other elements. In another example, multiple nodes may implement computer system 400 in a distributed manner.

In different embodiments, computer system 400 may be any of various types of devices, including, but not limited to, personal computer systems, mainframe computer systems, handheld computers, workstations, network computers, application servers, storage devices, a peripheral devices such as a switch, modem, router, or in general any type of computing or electronic device.

In various embodiments, computer system 400 may be a uniprocessor system including one processor 410, or a multiprocessor system including several processors 410 (e.g., two, four, eight, or another suitable number). Processors 410 may be any suitable processor capable of executing instructions. For example, in various embodiments processors 410 may be general-purpose or embedded processors implementing any of a variety of instruction set architectures (ISAs). In multiprocessor systems, each of processors 410 may commonly, but not necessarily, implement the same ISA.

System memory 420 may be configured to store program instructions 422 and/or data 432 accessible by processor 410. In various embodiments, system memory 420 may be implemented using any suitable memory technology, such as static random access memory (SRAM), synchronous dynamic RAM (SDRAM), non-volatile/Flash-type memory, or any other type of memory. In the illustrated embodiment, program instructions and data implementing any of the elements of the embodiments described above may be stored within system memory 420. In other embodiments, program instructions and/or data may be received, sent or stored upon different types of computer-accessible media or on similar media separate from system memory 420 or computer system 400.

In one embodiment, I/O interface 430 may be configured to coordinate I/O traffic between processor 410, system memory 420, and any peripheral devices in the device, including network interface 440 or other peripheral interfaces, such as input/output devices 450. In some embodiments, I/O interface 430 may perform any necessary protocol, timing or other data transformations to convert data signals from one component (e.g., system memory 420) into a format suitable for use by another component (e.g., processor 410). In some embodiments, I/O interface 430 may include support for devices attached through various types of peripheral buses, such as a variant of the Peripheral Component Interconnect (PCI) bus standard or the Universal Serial Bus (USB) standard, for example. In some embodiments, the function of I/O interface 430 may be split into two or more separate components, such as a north bridge and a south bridge, for example. Also, in some embodiments some or all of the functionality of I/O interface 430, such as an interface to system memory 420, may be incorporated directly into processor 410.

Network interface 440 may be configured to allow data to be exchanged between computer system 400 and other devices attached to a network (e.g., network 490), such as one or more external systems or between nodes of computer system 400. In various embodiments, network 490 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 440 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 450 may, in some embodiments, include one or more display terminals, keyboards, keypads, touchpads, scanning devices, voice or optical recognition devices, or any other devices suitable for entering or accessing data by one or more computer systems 400. Multiple input/output devices 450 may be present in computer system 400 or may be distributed on various nodes of computer system 400. In some embodiments, similar input/output devices may be separate from computer system 400 and may interact with one or more nodes of computer system 400 through a wired or wireless connection, such as over network interface 440.

In some embodiments, the illustrated computer system may implement any of the methods described above, such as the methods illustrated by the flowchart of FIG. 3. In other embodiments, different elements and data may be included.

Those skilled in the art will appreciate that computer system 400 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 400 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 400 may be transmitted to computer system 400 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow While the foregoing is directed to embodiments of the present invention, other and further embodiments of the invention may be devised without departing from the basic scope thereof, and the scope thereof is determined by the claims that follow.

The invention claimed is:

1. A method for routing Application Programming Interface (API) calls from a partner entity to a telephony service provider (TSP) network, wherein the partner entity is an external service provider that provides provisioning services and/or telephony services to customers of the TSP, the method comprising:
receiving a first message including an API call and a partner API key used to authenticate the partner entity on the TSP network to access a partner API layer disposed on the TSP network;
extracting the partner API key from the first message;
performing an authentication process to authenticate an identity of the partner entity using at least the extracted partner API key; and
routing the first message to the partner API layer based on the API call when the partner API key is authenticated.

2. The method of claim 1, wherein the first message is routed to the partner API layer disposed on the TSP network when the identity of the partner entity is authenticated.

3. The method of claim 1, wherein the first message is discarded and access to the partner API layer is denied when the identity of the partner entity is not authenticated.

4. The method of claim 3, further comprising:
sending an error message to the partner entity denying access to the partner API layer.

5. The method of claim 1, wherein the authentication process includes validating the extracted partner API key against a stored API key generated for the partner entity.

6. The method of claim 5, wherein the first message is received from one or more devices disposed on a partner network associated with the partner entity.

7. The method of claim 6, wherein the authentication process further includes comparing an identity of the one or more devices from which the first message was received against a stored list of devices associated with the partner entity.

8. The method of claim 1, wherein the first message is a service request message, and wherein the partner API key is embedded in a Simple Object Access Protocol (SOAP) envelope body of the service request message.

9. The method of claim 8, wherein a unique partner ID identifying the partner entity is further included in the SOAP envelope body along with the partner API key.

10. The method of claim 1, wherein the method is performed by a secure proxy layer communicatively coupled to the partner entity and the partner API.

11. The method of claim 10, wherein the secure proxy layer is Web based.

12. The method of claim 11, wherein the first message is received over a Hypertext Transfer Protocol Secure (HTTPS) connection.

13. The method of claim 1, wherein prior to receiving the first message including the API call, the method further comprises:
receiving a request to establish the partner entity on the TSP network;
generating the partner API key used to provide the partner entity access to the partner API layer; and
sending the generated partner API key to the partner entity.

14. The method of claim 2, further comprising:
extracting the API call from the message;
determining that the partner entity has been authorized to use the API call included in the first message; and
routing the API call to downstream network components disposed on the TSP network based on the determination that the partner entity has been authorized to use the API call.

15. The method of claim 2, further comprising:
extracting the API call from the message;
determining that the partner entity is not authorized to use the API call included in the message; and
sending an error message to the partner entity denying use of the API call.

16. The method of claim 1, further comprising:
receiving a second message including call back API call and a second partner API key used to authenticate the TSP on a network associated with the partner entity to access a partner data;
extracting the second partner API key from the second message;
performing a second authentication process to determine an identity of the TSP using at least the extracted second partner API key; and
routing the second message based on results of the second authentication process.

17. A secure proxy layer device for routing Application Programming Interface (API) calls from a partner entity to a telephony service provider (TSP) network, wherein the partner entity is an external service provider that provides provisioning services and/or telephony services to customers of the TSP, the secure proxy layer device comprising:

a) at least one processor;
b) at least one input device; and
c) at least one storage device storing processor-executable instructions which, when executed by the at least one processor, performs a method including
1) receiving a first message including an API call and a partner API key used to authenticate the partner entity on the TSP network to access a partner API layer disposed on the TSP network,
2) extracting the partner API key from the first message,
3) performing an authentication process to authenticate an identity of the partner entity using at least the extracted partner API key; and
4) routing the first message to the partner API layer based on the API call when the partner API key is authenticated.

18. The secure proxy layer device of claim 17, wherein the first message is routed to the partner API layer disposed on the TSP network when the identity of the partner entity is authenticated.

19. The secure proxy layer device of claim 17, wherein the first message is discarded and access to the partner API layer is denied when the identity of the partner entity is not authenticated.

20. The secure proxy layer device of claim 19, wherein the method further comprises:

sending an error message to the partner entity denying access to the partner API layer.

21. The secure proxy layer device of claim 17, wherein the authentication process includes validating the extracted partner API key against a stored API key generated for the partner entity.

22. The secure proxy layer device of claim 21, wherein the first message is received from one or more devices disposed on a partner network associated with the partner entity, and wherein the authentication process further includes comparing an identity of the one or more devices from which the first message was received against a stored list of devices associated with the partner entity.

23. A non-transient computer readable medium for storing computer instructions that, when executed by at least one processor causes the at least one processor to perform a method for routing Application Programming Interface (API) calls from a partner entity to a telephony service provider (TSP) network, wherein the partner entity is an external service provider that provides provisioning services and/or telephony services to customers of the TSP, the method comprising:

receiving a first message including an API call and a partner API key used to authenticate the partner entity on the TSP network to access a partner API layer disposed on the TSP network;
extracting the partner API key from the first message;
performing an authentication process to authenticate an identity of the partner entity using at least the extracted partner API key; and
routing the first message to the partner API layer based on the API call when the partner API key is authenticated.

24. The computer readable medium of claim 23, wherein the method further comprises:

throttling API requests based on criteria relating to the partner entity.

* * * * *